United States Patent [19]

King

[11] Patent Number: 4,712,292
[45] Date of Patent: Dec. 15, 1987

[54] METHOD OF ASSEMBLING A STATIONARY ASSEMBLY FOR A DYNAMOELECTRIC MACHINE

[75] Inventor: James L. King, Holland, Mich.

[73] Assignee: General Electric Company, Fort Wayne, Ind.

[21] Appl. No.: 660,101

[22] Filed: Oct. 12, 1984

[51] Int. Cl.[4] .............................................. H02K 15/00
[52] U.S. Cl. ........................................ 29/596; 29/450; 29/605; 29/609; 310/42; 310/91; 310/217; 310/259
[58] Field of Search ....................... 310/42, 89, 91, 216, 310/217, 258, 259, 254; 29/596, 609, 522 R, 450, 605

[56] References Cited

U.S. PATENT DOCUMENTS

| | | |
|---|---|---|
| 1,795,882 | 3/1931 | Noden . |
| 2,247,890 | 7/1941 | Reardon ............................ 171/252 |
| 2,448,785 | 9/1948 | Dolan ............................... 171/252 |
| 2,774,897 | 12/1956 | Matthews ........................ 310/217 |
| 2,818,515 | 12/1957 | Dolenc ............................. 310/57 |
| 3,159,762 | 12/1964 | Haifley ............................. 310/217 |
| 3,283,399 | 11/1966 | Hart et al. ....................... 29/155.57 |
| 3,577,851 | 5/1971 | Detheridge et al. ............ 29/596 |
| 3,807,040 | 4/1974 | Otto ................................ 29/522 R |
| 3,858,067 | 12/1974 | Otto ................................ 310/42 |
| 3,867,654 | 2/1975 | Otto ................................ 310/42 |
| 3,894,956 | 7/1975 | Whitt ............................... 252/14 |
| 4,206,624 | 6/1980 | Asai et al. ........................ 72/131 |
| 4,208,559 | 6/1980 | Gray ................................ 29/622 |
| 4,306,168 | 12/1981 | Peachee .......................... 310/91 |
| 4,409,714 | 10/1983 | Cunningham .................. 310/42 |
| 4,521,953 | 6/1985 | King et al. ...................... 29/596 |
| 4,594,773 | 6/1986 | Frank et al. .................... 310/89 |
| 4,613,780 | 9/1986 | Fritzsche ......................... 310/216 |
| 4,643,012 | 2/1987 | Wiedeman ...................... 242/83 |

FOREIGN PATENT DOCUMENTS

| | | | |
|---|---|---|---|
| 1139815 | 1/1983 | Canada ............................ | 29/596 |
| 2706717 | 9/1977 | Fed. Rep. of Germany ... | 29/596 |
| 0770644 | 2/1977 | South Africa . | |

Primary Examiner—R. Skudy
Attorney, Agent, or Firm—Ralph E. Krisher, Jr.

[57] ABSTRACT

A method of assembling a stationary assembly for a dynamoelectric machine includes associating at least one beam in a preselected assembly position with a core at least adjacent a circumferential portion thereof. A set of sections of the core at least adjacent the circumferential sections thereof are deformed into gripping engagement with the at least one beam, respectively, and thereby the at least one beam is retained against displacement from the selected assembly position thereof.

29 Claims, 21 Drawing Figures

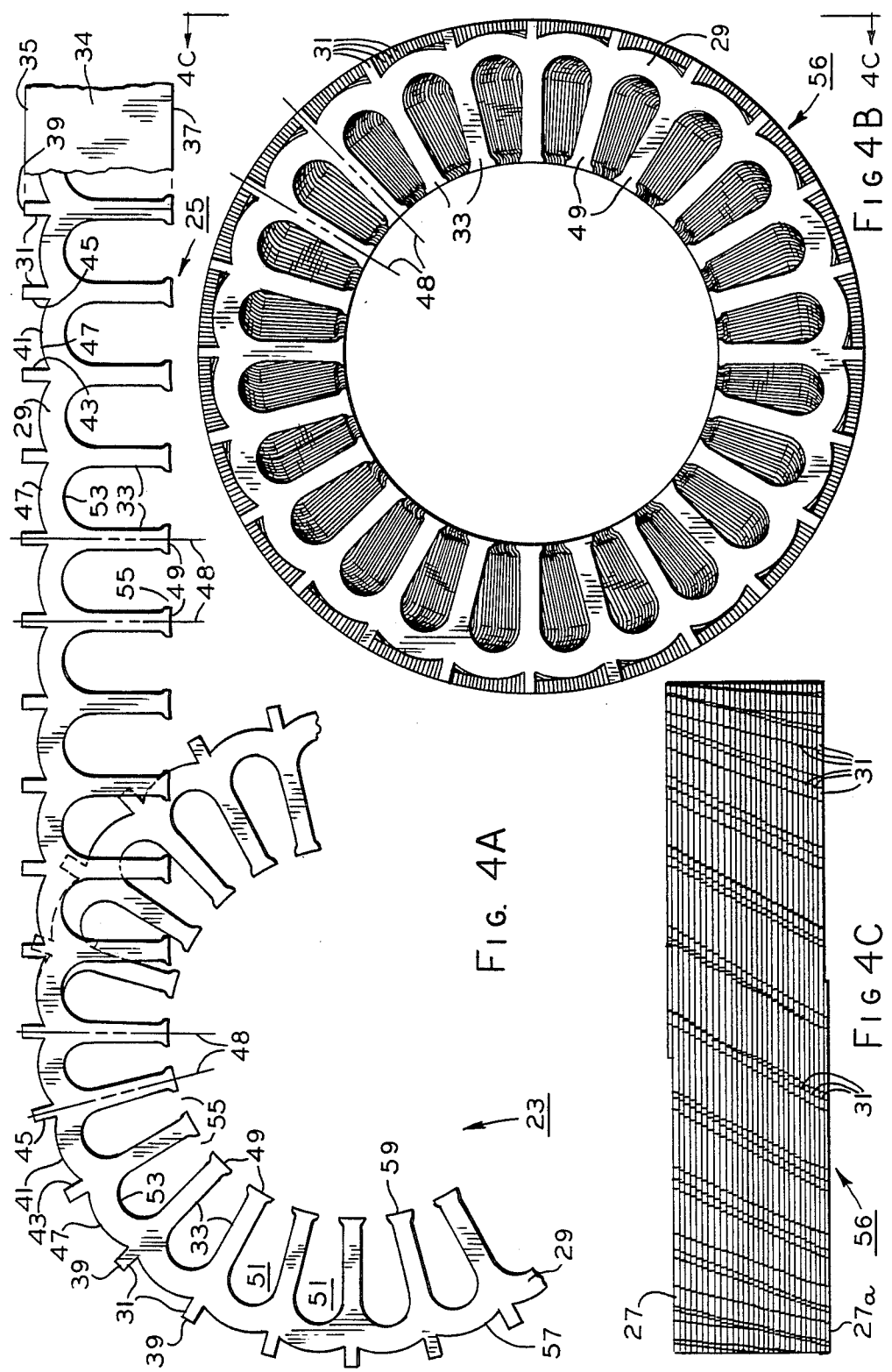

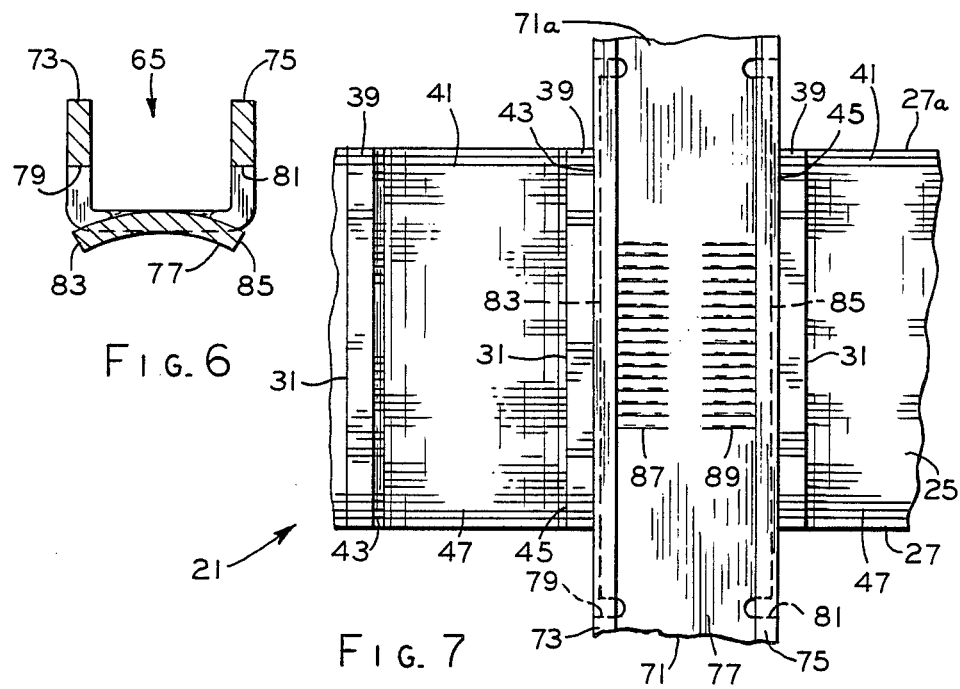
FIG. 6
FIG. 7
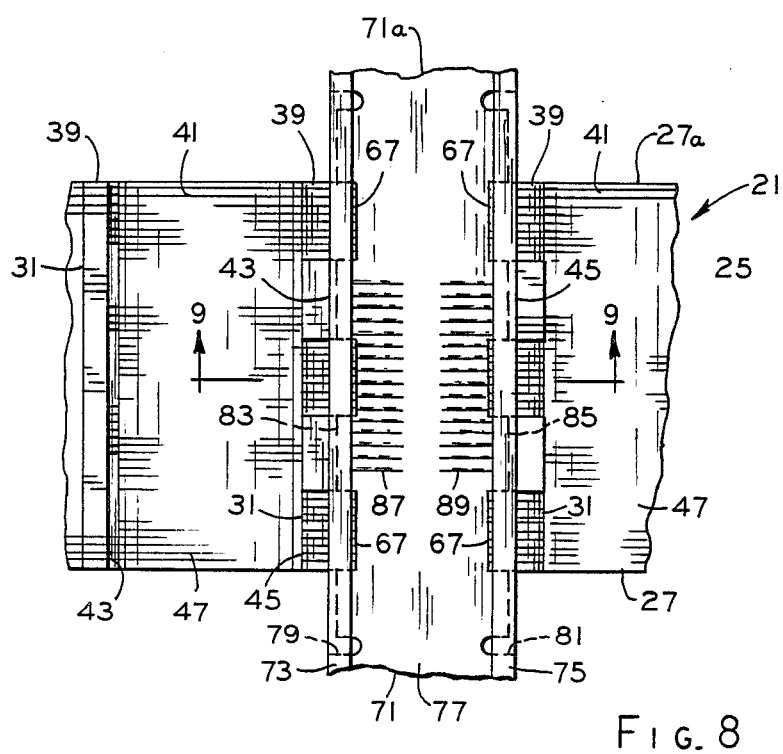
FIG. 8

METHOD OF ASSEMBLING A STATIONARY ASSEMBLY FOR A DYNAMOELECTRIC MACHINE

CROSS-REFERENCE TO RELATED APPLICATIONS

This application is related to the following listed, commonly assigned applications filed concurrently herewith which are incorporated by reference herein, respectively:

(1) Application Ser. No. 660,211 filed Oct. 12, 1984 of Harold L. Fritzsche entitled "Lanced Strip, Core, Method Of Forming Such Core, And Apparatus"; and (2) Application Ser. No. 660,116 filed Oct. 12, 1984 of Gustave F. Wiedemann entitled "Apparatus And Methods For Forming Edgewise Wound Cores".

FIELD OF THE INVENTION

This application relates in general to electrical apparatus and in particular to a method of assembling a stationary assembly for a dynamoelectric machine.

BACKGROUND OF THE INVENTION

In the past, various different cores or stators have been provided for dynamoelectric machines of various different constructions, and such cores have been formed in various different manners. For instance, in some of the past dynamoelectric machine constructions, the core thereof was formed of a plurality of generally rectangular stacked laminations of a generally thin ferromagnetic material, and in other dynamoelectric machine constructions, a lanced strip of such generally thin ferromagnetic material was edgewise and helically wound into a plurality of helical convolutions thereof having a preselected stack height thereby to form an edgewise wound core.

In the past dynamoelectric machine construction having a core formed of the rectangular stacked laminations, a bore was provided through such stacked lamination core in spaced relation from the corner sections thereof, and a set of grooves were provided in such corner section of the stacked lamination core extending generally axially across the circumferential surface thereof, respectively. A set of beams were disposed in the grooves at the corner sections of the stacked lamination core with opposite end portions on the beams extending beyond opposite end faces of the stacked lamination core, and the beams were deformed into displacement preventing engagement with the stacked lamination core thereby to secure the beams in the grooves therefor in the stacked lamination core, respectively. It is believed that the mass of the stacked lamination core between the corner sections and the bore thereof was great enough to obviate distortion of the bore and the teeth of the core in part defining such bore in response to forces applied onto the beams to effect the aforementioned deformation thereof into the displacement preventing engagement with the stacked lamination core. A pair of opposite end frames were attached to the opposite ends of the beams in spaced relation with the opposite end faces of the stacked lamination core, and of course, a rotatable assembly was associated with the stacked lamination core so as to extend through the bore thereof with opposite parts of the rotatable assembly being journaled in the opposite end frames carried by the beams secured to the stacked lamination core. One of the past dynamoelectric machine constructions utilizing a stacked lamination core with beams secured thereto, as discussed above, is shown in the U.S. Pat. No. 3,867,654 issued Feb. 18, 1975 to Charles W. Otto.

One of the advantages involved in utilizing a past one of the edgewise wound cores in the past dynamoelectric machine constructions instead of the past generally rectangular stacked lamination cores was, of course, the economy of the ferromagnetic material. For instance and as previously mentioned with respect to the formation of such past edgewise wound cores, the continuous lanced strip of generally thin ferromagnetic material was edgewise and helically wound into the stack of generally helical convolutions thereof to define such an edgewise wound core. Since the lanced strip was formed into helical convolutions thereof, the stack of such helical convolutions resulting in the edgewise wound core was generally annular in shape having a generally radially thin and round yoke section with a plurality of teeth extending generally radially inwardly therefrom to define in part a bore which extended generally axially through the stack of helical convolution of the lanced strip. Since the edgewise wound core formed from the continuous lanced strip was generally annular in shape, such edgewise wound core was, of course, devoid of the corner sections embodied in the above discussed generally rectangular stacked lamination core; therefore, the aforementioned economy of ferromagnetic material between the past edgewise wound core with respect to the past generally rectangular stacked lamination core was effected. However, at least one of the disadvantageous or undesirable features of such past edgewise wound cores is believed to have involved the problem of securing a beam to the yoke section of the past edgewise wound core generally at the circumferential surface thereof without distorting the bore of the edgewise wound core or the teeth thereof defining in part such bore.

SUMMARY OF THE INVENTION

Among the several objects of the present invention may be noted the provision of an improved method of assembling a stationary assembly for a dynamoelectric machine; the provision of such improved method utilizing a lanced strip in which a plurality of teeth and extensions extend oppositely from a continuous yoke section of the lanced strip on pitch axii of the teeth; the provision of such improved in which the extensions and teeth on the pitch axis therefor define the radially thickest and strongest sections of the edgewise wound core; the provision of such improved in which the lanced strip is edgewise and helically wound to form the edgewise wound core with the teeth and the extensions on the yoke section extending generally radially inwardly and outwardly therefrom in radial alignment, respectively; the provision of such improved in which the teeth and extensions on the yoke section extend generally in spaced apart row formations between a pair of opposite end faces of the core; respectively; the provision of such improved method in which at least one beam is retained against displacement from a preselected assembly position on the core between adjacent ones of the extensions; the provision of such improved method in which sets of means are deformed from the circumferential portion of the core into engagement with confronting parts of the at least one beam for retaining the at least one beam against displacement from a preselected assembly position thereof at least adjacent the circumferential portion of the core, respectively; the provision of such improved method in which the at least one beam is provided with means therein for receiving the retaining means deformed from the core, respectively; and the provision of such improved in which the component parts utilized therein are simple in design, easily assembled and economically manufactured. These as well as other objects and advantageous features of the present invention will be in part apparent and in part pointed out hereinafter.

In general, a method is provided in one form of the invention for assembling a stationary assembly for a dynamoelectric machine. The stationary assembly includes a core having a pair of opposite end faces with a circumferential portion interposed therebetween, and at least one beam. In practicing this method, the at least one beam is associated in a preselected assembly position with the core at least adjacent the circumferential portion thereof. A set of sections on the circumferential portion of the core is deformed into gripping engagement with the at least one beam, respectively, and thereby the at least one beam is retained against displacement from the preselected assembly position thereof.

BRIEF DESCRIPTION OF THE DRAWINGS

FIG. 4A is a top elevational view of the core of FIG. 3, and the lanced strip of FIG. 4 is shown extending from the core as a comparison with respect to the shape of the lanced strip upon the edgewise deformation thereof into the core and to illustrate principles which may be practiced in a method of forming an edgewise wound core;

FIG. 4B is a top elevational view of a helical convolution stack of the deformed lanced strip during an initial stage of the formation of the core shown in FIG. 4A;

FIG. 4C is a side elevational view of the helical convolution stack of FIG. 4B;

FIG. 6 is a sectional view taken along lines 6—6 in FIG. 5;

FIG. 7 is a partial top elevational view of the core of FIG. 3 showing the beam of FIG. 5 associated in a preselected assembly position therewith;

FIG. 8 is generally the same as FIG. 7 but showing sections of adjacent extensions on the core deformed into displacement preventing engagement with the beam in its preselected assembly position;

Corresponding reference characters refer to corresponding parts throughout the several views of the drawing.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
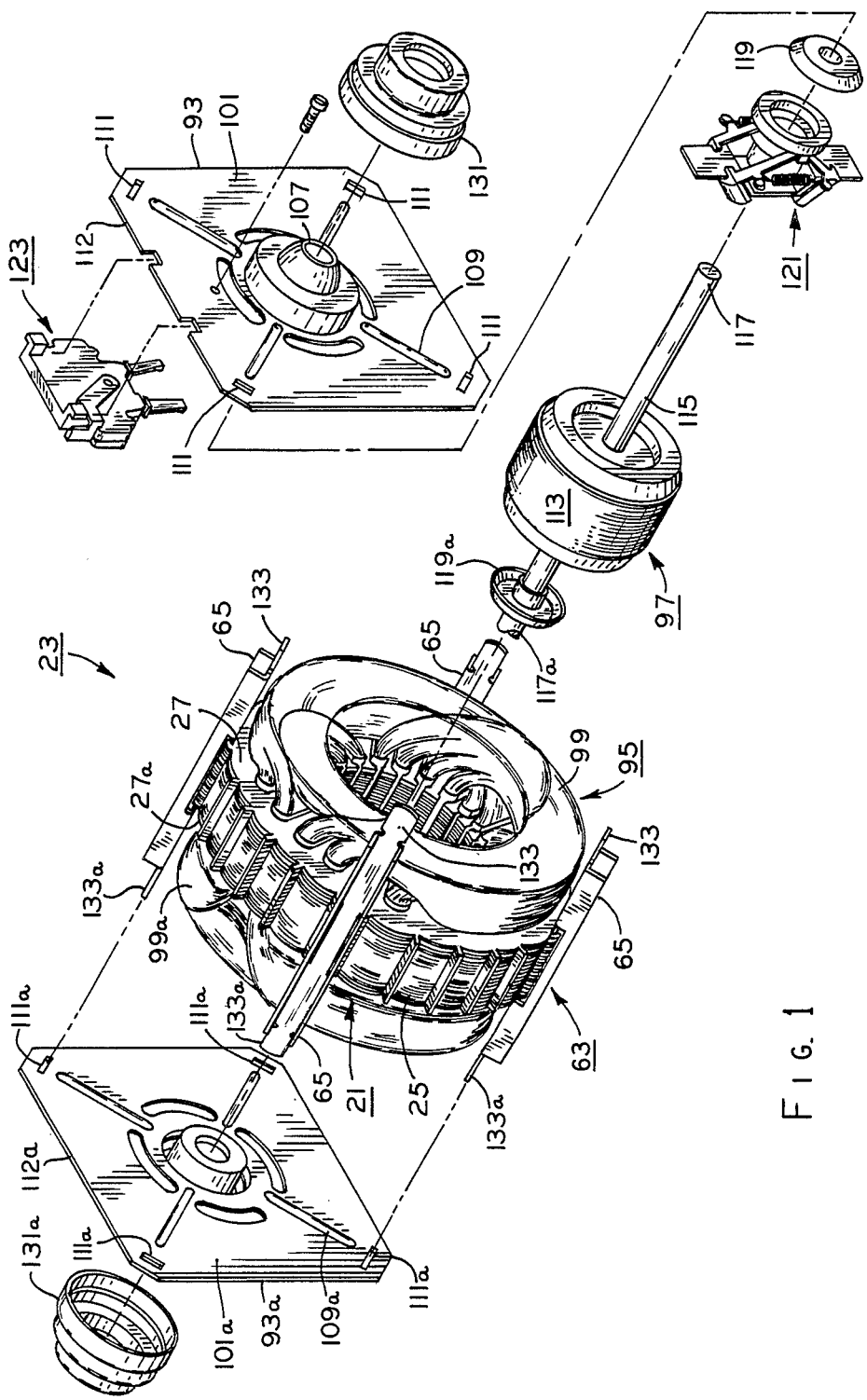
FIG. 1 is an exploded perspective view showing a dynamoelectric machine and illustrating principles which may be practiced in a method of assembling a stationary assembly for a dynamoelectric machine in one form of the invention.
Figure 2:
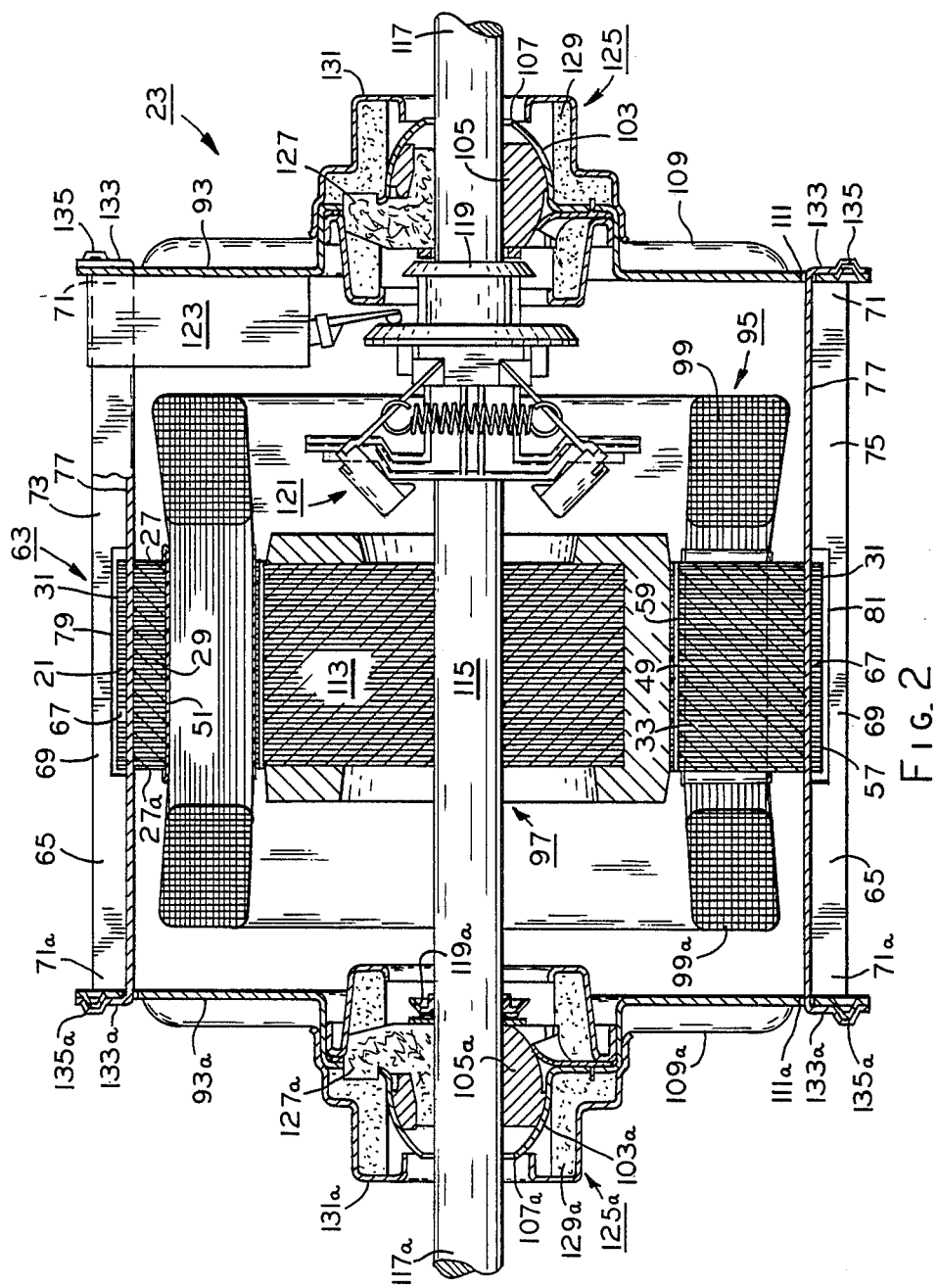
FIG. 2 is a sectional view showing the dynamoelectric machine of FIG. 1 in cross section.
Figure 3:
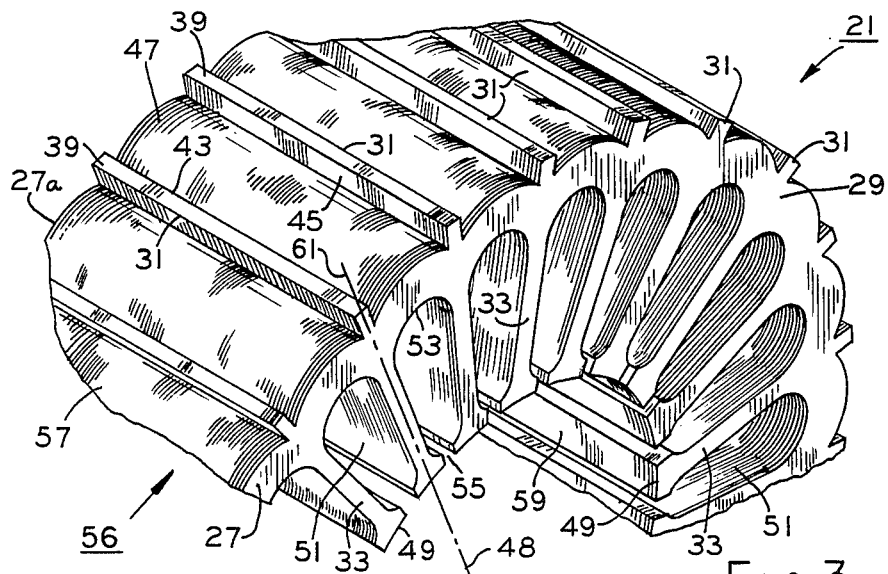
FIG. 3 is an enlarged partial perspective view of a core utilized in the stationary assembly of FIG. 1 with the winding means omitted for clarity.

With reference now to the drawings in general, there is shown an edgewise wound core 21 for a dynamoelectric machine 23 (FIG. 1). Core 21 is formed of a spirally or helically wound lanced strip 25 of generally thin ferromagnetic material having a pair of opposite end faces 27, 27a with a yoke or yoke section 29 therebetween (FIGS. 1-3). A plurality of extensions 31 and a plurality of teeth 33 on lanced strip 25 extend generally oppositely and radially from yoke section 29 and generally in row formation between opposite end faces 27, 27a of core 21, respectively, and the extensions are arranged generally in radial alignment with respective ones of the teeth (FIG. 3).

More particularly and with specific reference to FIG. 4, lanced strip 25 may be lanced or otherwise formed by suitable means well known to the art, such as progressive dies or the like for instance, from a strip stock 34 of generally thin ferromagnetic material having the desired electrical characteristics and the physical properties desirable to enhance the edgewise winding of lanced strip 25 into core 21, as discussed in greater detail hereinafter. Strip stock 34 has a pair of generally parallel opposite edges 35, 37, and extensions or extension means 31 are provided on lanced strip 25 for defining a plurality of lands 39 and grooves 41 therein with the lands being defined by opposite edge 35 of strip stock 34 thereby to provide an interrupted opposite edge on the lanced strip. Grooves 41 include a pair of opposed sidewalls 43, 45 intersecting with lands 39 of adjacent ones of extensions 31, and a plurality of generally arcuate outer edges 47 on lanced strip 25 defines a scalloped shaped base wall of the grooves interposed between the opposed sidewalls thereof, respectively. It may be noted that extensions 31 and teeth 33 are disposed on or aligned generally about preselected pitch axis 48 of the teeth which have tips or tip sections 49 defined by opposite edge 37 of strip stock 34, respectively, thereby to provide an interrupted opposite edge on lanced strip 25; therefore, the dimension of the lanced strip between lands 39 and tooth tips 49 is predeterminately the same as that between opposite edges 35, 37 of strip stock 34. While extensions 31 and teeth 33 are illustrated herein as being on pitch axes 48 of the teeth, it is contemplated that the extensions may be provided on the pitch axes of only some of the teeth and also that the extensions and teeth may be of various different shapes with some of the extensions being shorter than others thereof within the scope of the invention so as to meet at least some of the objects thereof. A plurality of slots 51 are provided through lanced strip 25 at least in part between adjacent ones of teeth 33, and a plurality of arcuate inner edges 53 on the lanced strip generally opposite arcuate outer edges 47 thereof define a closed end of the slots, respectively. Although outer and inner edges 47, 53 on lanced strip 25 are discussed herein as being generally arcuate, it is contemplated that such edges may have other shapes, such as for instance respectively having opposed flat portions thereon or being entirely generally flat instead of arcuate, within the scope of the invention so as to meet at least some of the objects thereof. It may be noted that each of the plurality of sets of arcuate outer and inner edges 47, 53 on lanced strip 25 have generally the same arcuate configuration generated about the same center point with the arcuate inner edges being smoothly formed with opposed ones of the opposite side edges of teeth 33, respectively. A plurality of open ends 55 of slots 51 intersect with opposite edge 37 of strip stock 34 between adjacent ones of tooth tips 49, and the open ends of the slots are arranged generally opposite closed ends thereof defined by inner edges 53 on lanced strip 25, respectively. Thus, lanced strip 25 generally comprises continuous yoke section 29 extending generally lengthwise or longitudinally of the lanced strip, and extensions 31 and teeth 33 on the lanced strip extend generally laterally from the yoke section with the extensions being interposed between adjacent ones of acruate outer edges 47 so as to extend in part therebeyond and with the teeth being interposed between adjacent ones of arcuate inner edges 53, respectively. While the width of extensions 31 are illustrated herein as being less than the width of teeth 33 for purposes of disclosure, it is contemplated that the width of the extensions may be no greater than the widths of the teeth within the scope of the invention so as to meet as least some of the objects thereof.

Figure 4:
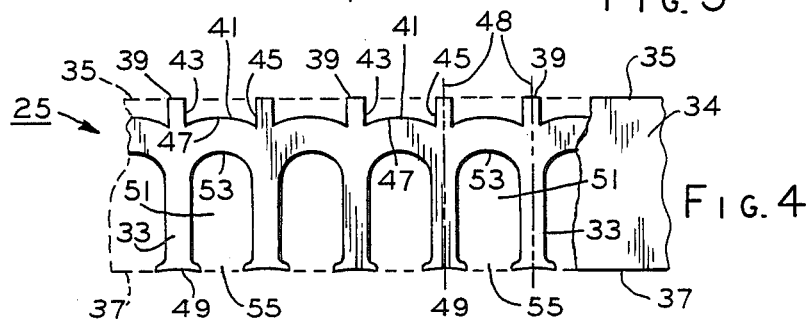
FIG. 4 is a front elevational view of a part of a lanced strip of generally thin ferromagnetic material from which the core of FIG. 3 is edgewise and helically wound.

Referring again to the drawings in general and recapitulating at least in part with respect to the foregoing, there is shown a method of forming edgewise wound core 21 from strip stock 34 (FIGS. 4A–4C). In practicing this method, lanced strip 25 is lanced from strip stock 34 with the lanced strip having continuous yoke section 29, teeth 33 extending on preselected pitch axes 48, and extensions 31 on the pitch axes of at least some of the teeth and extending generally opposite thereto, respectively (FIGS. 4 and 4A). Lanced strip 25 is deformed into a stack 56 of continuous helical convolutions thereof with teeth 33 extending on their pitch axes 48 from yoke section 29 of the deformed lanced strip generally radially inwardly of helical convolution stack 56 and with extensions 31 on the pitch axes of at least some of the teeth extending from the yoke section of the deformed lanced strip generally radially outwardly of the helical convolution stack, respectively (FIGS. 4B and 4C). Extensions 31 and teeth 33 are positioned or otherwise disposed or aligned generally in axial row formation across helical convolution stack 56, respectively (FIG. 3).

More particularly and with specific reference to FIGS. 3, 4 and 4A–4C, when core 21 is formed or wound from lanced strip 25, the lanced strip is, of course, wound in an edgewise and helical or spiral fashion into the helical convolutions defining stack 56 thereof. Upon the accumulation of deformed lanced strip 25 into helical convolution stack 56, yoke section 29 of the deformed lanced strip has a generally annular configuration in the helical convolution stack with such stack having a preselected axial length or stack height as measured with respect to the centerline axis thereof, and extensions 31 and teeth 33 on the yoke section of the deformed lanced strip in the helical convolution stack thereof are generally angularly displaced from each other, as best seen in FIGS. 4B and 4C. The helical convolutions of deformed lanced strip 25 in stack 56 are easily adjustable or positioned one to another thereof, and upon such adjustment or positioning, extensions 31 and teeth 33 on yoke section 29 of the deformed lanced strip are disposed or otherwise aligned generally in the aforementioned axial row formations thereof across the helical convolution stack thereby to effect the formation of core 21, as best seen in FIGS. 3 and 4A. Albeit not shown for purposes of brevity of disclosure, teeth 33 on deformed lanced strip 25 of helical convolution stack 56 may be associated in aligning relation with various different fixtures or alignment arbors or the like for instance which are well known to the art to effect the aforementioned adjustment or repositioning of the helical convolutions in the stack 56. Of course, the leading and trailing end portions of deformed lanced strip 25 in helical convolution stack 56 define opposite end faces 27, 27a of core 21.

When core 21 is so formed or edgewise wound, the sets of outer edges 47 on yoke section 29 of deformed lanced strip 25 are also aligned across core 21 thereby to define a circumferential surface 57 about the core between opposite end faces 27, 27a thereof, and the circumferential surface is, of course, interrupted by extensions 31 extending in the axial row formations thereof transversely across the core, respectively. Further, with teeth 33 arranged in the axial row formation thereof across core 21 between opposite faces 27, 27a thereof, tips 49 of the teeth define in part a bore 59 which extends generally axially through the core intersecting with the opposite end faces thereof, respectively, as best seen in FIGS. 2 and 3. Of course, open ends 55 of slots 51 intersect with bore 59 of core 21, and yoke section 29 of the core between opposite end faces 27, 27a thereof is defined generally between closed ends 53 of slots 51 and base walls 47 of grooves 41, respectively. It may be noted that extensions 31, teeth 33, grooves 41 and slots 51 are arranged generally in row formation so as to extend generally axially or transversely across core 21 between opposite end faces 27, 27a thereof and also that the teeth and extensions are predeterminately arranged so as to extend oppositely from yoke section 29 in radial alignment or relation with each other, as illustrated by a radius line or radial axis of the core indicated at 61 which represents one of pitch axes 48 of the teeth in FIG. 3. Additionally, it may also be noted that the radial dimension from the centerline axis of core 21 and lands 39 on extensions 31 is greater than any other radial dimension between the centerline axis of the core and any other part thereof. If a more detailed discussion of the winding of a lanced strip into an edgewise wound core is desired, reference may be had to the aforementioned commonly assigned patent application Ser. No. 660,211.

Figure 5:
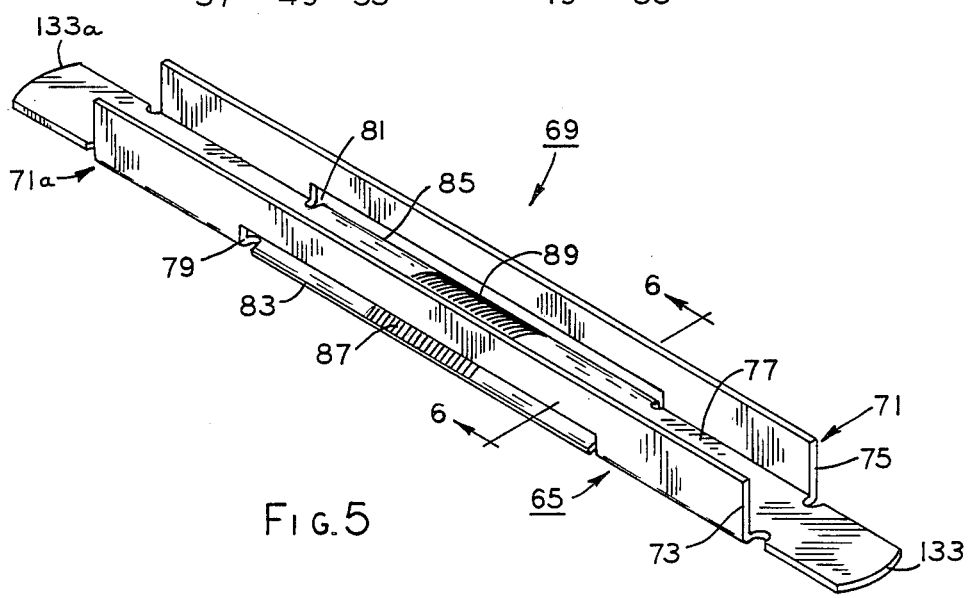
FIG. 5 is an enlarged perspective view of a beam utilized in the stationary assembly of FIG. 1 and disassociated therefrom for clarity.

With further reference to the drawings in general and recapitulating at least in part with respect to the foregoing, there is illustrated in one form of the invention a method of assembling a stationary assembly 63 for dynamoelectric machine 23 (FIG. 1). Stationary assembly 63 includes core 21 having opposite end faces 27, 27a with circumferential portion 57 interposed therebetween and a set of beams 65 (FIGS. 1, 3 and 5). In practicing this method, beams 65 are associated in a preselected assembly position with core 21 adjacent circumferential portion 57 thereof (FIG. 7). A set of sections 67 on circumferential portion 57 of core 21 is deformed or otherwise displaced into gripping or displacement preventing engagement with beams 65, and thereby the beams are retained against displacement from the preselected assembly positions thereof, respectively (FIGS. 8 and 9).

More particularly and with specific reference to FIGS. 5 and 6, beams 65 are formed with a generally U-shaped channel including an intermediate portion or section 69 integrally interposed between a pair of opposite end portions or sections 71, 71a, and the intermediate and opposite end portions are defined at least in part by a pair of opposite sidewalls 73, 75 integrally intersecting with a cross or base wall 77, respectively. A set of generally elongate openings or slots 79, 81 extend through opposite sidewalls 73, 75 at least adjacent the intersections thereof with cross wall 77 and at least in part within intermediate portion 69 of beams 65, and a set of opposite marginal edges 83, 85 are provided on the cross wall adjacent the openings and at least in part within the intermediate portion of the beams, respectively. It may be noted that the configurations of cross walls 77 on beams 65 at least in part generally corresponds to that of base walls 47 of grooves 41 in core 21. If desired, a set of serrations 87, 89 may be provided on cross wall 77 adjacent openings 79, 81 and opposite marginal edges 83, 85 on the cross wall.

Figure 9:
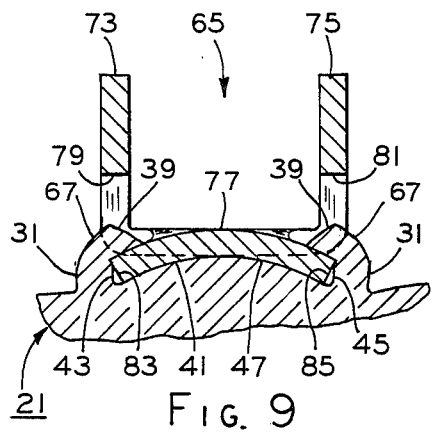
FIG. 9 is a sectional view taken along 9—9 in FIG. 8.

While the association of all of beams 65 with core 21 may be accomplished simultaneously, as discussed hereinafter, such association of only one of the beams, is illustrated in FIGS. 7-9 for purposes of drawing simplicity; however, it is contemplated that the beams may be associated individually or in sets thereof with the core within the scope of the invention so as to meet at least some of the objects thereof. Beams 65 are associated in the preselected assembly positions thereof with respect to core 21 by placing intermediate sections 69 of the beams at least in part within preselected ones of grooves 41 in the core and extending opposite end portions 71, 71a of the beams generally axially beyond opposite end faces 27, 27a of the core, respectively, as best seen in FIG. 7. In this manner, a part of opposite sidewalls 73, 75 of beams 65 within intermediate portions 69 thereof are disposed at least adjacent opposed sidewalls 43, 45 of the aforementioned preselected grooves 41, and cross walls 77 of the beams within the intermediate portions thereof are seated at least in part in engagement with base walls 47 of such preselected grooves, respectively, as best seen in FIG. 9. Thus, openings 79, 81 in opposite sidewalls 73, 75 and opposite marginal edges 83, 85 on base wall 77 of beams 65 are positioned at least adjacent opposed sidewalls 43, 45 of the preselected grooves 41, respectively. With beams 65 so arranged in the preselected assembly positions thereof within the preselected grooves 41 in core 21, sections 67 of extensions 31 are deformed or otherwise bent or swedged over by suitable tooling (not shown) in a manner well known to the art thereby to displace a set of corresponding parts of opposed sidewalls 43, 45 of preselected grooves 41 into overlaying or gripping engagement with confronting parts on cross walls 77 of the beams at least adjacent openings 79, 81 therein and into abutting engagement with opposite marginal edges 83, 85 on the cross walls of the beams thereby to retain the beams against displacement from the preselected assembly positions thereof with respect to the preselected grooves in the core, respectively. Upon the deformation of sections 67 in extensions 31, as discussed above, it may be noted that the displaced corresponding parts of opposed sidewalls 43, 45 are passed or moved at least in part through openings 79, 81 in opposite sidewalls 73, 75 of beams 65 into the gripping engagement with serrations 87, 89 on cross walls 77 of the beams, respectively. While core 21 is illustrated herein with each extension 31 and tooth 33 arranged in the radial alignment thereof for purposes of disclosure, it is contemplated that the core may have fewer extensions than teeth within the scope of the invention so as to meet as least some of the objects thereof. For instance, in this vein, it is contemplated that only the adjacent pairs of extensions 31 may be provided on core 21 with the preselected grooves 41 therebetween in which beams 65 are secured against displacement from the preselected assembly positions thereof, respectively, as discussed above. As previously mentioned, extensions 31 are predeterminately arranged on pitch axes 48 of teeth 33 so as to be disposed in radially aligned relation with the teeth on core 21, and it may be noted that such predetermined arrangement thereby locates the extensions generally at the thickest and strongest radial cross section of the core to absorb the generally radially directed loads or forces exerted on the extensions when sections 67 thereof are deformed into gripping engagement with beams 65 without incurring deformation or distortion in the yoke section or the teeth of the core. While sections 67 of extensions 31 are shown displaced into the gripping engagement thereof with beams 65 for purpose of disclosure, it is contemplated that either a fewer or greater number of such sections, or the entire expanse of the extensions across core 21, may be deformed into gripping engagement with the beams within the scope of the invention so as to meet at least some of the objects thereof. Albeit not shown for purposes of drawing simplicity, it is contemplated that a fixture would be inserted into back-up engagement with the bore of the edgewise wound core upon the exertion of the forces on the extensions to secure the beams to the core, as discussed above.

Figure 9A:
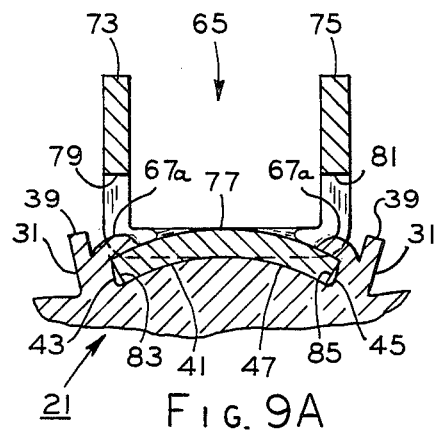
FIG. 9A is generally the same as FIG. 6 illustrating an alternative deformation of the adjacent extensions.

As alternatively shown in FIG. 9A, sections 67a of extensions 31 may be severed therefrom by suitable tooling (not shown) well known to the art and deformed, i.e., swedged or bent, into the overlaying or gripping engagement with confronting parts on cross walls 77 of beams 65 with the section 67a extending at least in part through openings 79, 81 in opposite side walls 73, 75 of the beams, respectively, within the scope of the invention so as to meet at least some of the objects thereof.

With further reference to the drawings in general and recapitulating at least in part with respect to the foregoing, there is shown stationary assembly 63 for dynamoelectric machine 23 (FIG. 1). Stationary assembly 63 includes core 21 having opposite end faces 27, 27a with circumferential portion 57 interposed therebetween and beams 65 which are associated in preselected assembly positions with the circumferential portion of the core, respectively (FIGS. 2 and 7-9). Core 21 also has a set of means, such as sections 67 or the like for instance, deformed from circumferential portion 57 of the core into gripping engagement with beams 65 for retaining the beams against displacement from the preselected assembly positions thereof, respectively (FIGS. 7-9).

Dynamoelectric machine 23 comprises stationary assembly 63 and a pair of opposite end frames 93, 93a mounted to beams 65 in spaced apart relation with opposite end faces 27, 27a of core 21 (FIGS. 1 and 2). Winding means 95 adapted for excitation is arranged on core 21, and a rotatable assembly 97 associated with the core and rotatably supported in opposite end frames 93, 93a is adapted for magnetic coupling relation with the winding means upon the excitation thereof (FIG. 2).

More particularly and with specific reference to FIGS, 1 and 2, winding means 95, such as a plurality of conductor turns or coils thereof of generally round insulated magnet wire arranged in a desired winding configuration, is disposed in slots 51 of core 21 with suitable slot insulation and slot wedges therebetween, and the winding means has a pair of opposite generally annular groupings of end turns 99, 99a thereof disposed generally about bore 59 of the core adjacent opposite end faces 27, 27a thereof, respectively.

End frames 93, 93a may be lanced or otherwise formed from a metallic sheet material, such as for instance sheet steel or the like, and it is contemplated that such formation of the end frames may be accomplished by the use of progressive dies or the like for instance (not shown). End frames 93, 93a include a pair of generally planar portions or sections 101, 101a formed so as to extend about generally central portions of the end frames which define a pair of means, such as bearing seats or seating surfaces 103, 103a or the like, for seating or bearing engagement with bearings 105, 105a, as further discussed hereinafter, and a pair of shaft receiving openings 107, 107a extend through the bearing seats, respectively. Although end frames 93, 93a are disclosed as having generally planar portions 101, 101a, the end frames may be provided with a pair of sets of means, such as for instance a plurality of ribs 109, 109a or the like, for strengthening the generally planar portions and may have passages for the passage of ambient air therethrough, respectively. Sets of apertures or generally elongate slots 111, 111a are arranged in preselected locations generally radially outwardly of the central portion of end frames 93, 93a adjacent circumferential edges 112, 112a thereof, respectively. While the construction and configuration of end frames 93, 93a are described and illustrated herein for purposes of disclosure, it is contemplated that various other end frames having different constructions and configurations as well as being formed in different manners and of different material may be utilized.

Rotatable assembly 97 includes a rotor 113 mounted to a shaft 115 between a pair of opposite shaft end portions or extensions 117, 117a for conjoint rotation therewith, and a pair of thrust devices 119, 119a are secured to the opposite shaft extensions for thrust taking or end play engagement with bearings 105, 105a of end frames 93, 93a, respectively. Rotor 113 is disposed at least in part within bore 59 of core 21 with a generally uniform air or flux gap therebetween and is arranged in magnetic coupling relation with winding means 95 of the core upon the excitation thereof when dynamoelectric machine 23 is energized across a power source (not shown). Although rotor 113 is illustrated herein for purposes of disclosure, it is contemplated that various other types of rotors, such as for instance one carrying a set of permanent magnet material elements for selective magnetic coupling engagement with winding means 95 upon the excitation thereof, may be utilized. A centrifugal mechanism 121 is carried on opposite shaft extension 117 for conjoint rotation therewith, and if a more detailed discussion of the construction and operation of the centrifugal mechanism is desired, reference may be had to U.S. Pat. No. 4,208,559 issued June 17, 1980 to Steven J. Gray which is incorporated herein by reference. Of course, centrifugal mechanism 121 is arranged to operate a switch assembly 123 carried on end frame 93 for controlling the excitation of winding means 95 on core 21 during the energization of dynamoelectric machine 23, as well known in the art, and if a more detailed discussion of the construction and operation of the switch assembly and the association thereof with the winding means and the end frame, reference may be had to the commonly assigned James L. King patent application Ser. No. 496,552 filed May 20, 1983 and the commonly assigned James P. Frank and James L. King patent application Ser. No. 496,524 filed May 20, 1983 (now U.S. Pat. No. 4,594,773 issued June 17, 1986) which are respectively incorporated herein by reference. Depending upon the winding configuration of winding means 95, it is, of course, contemplated that centrifugal mechanism 121 and switch assembly 123 may be omitted from dynamoelectric machine 23. Opposite shaft extensions 117, 117a extend through shaft openings 107, 107a in end frames 93, 93a and are received in journaling engagement with bearings 105, 105a arranged on bearing seats 103, 103a on the end frames, respectively. If a more detailed discussion of the construction of bearings 105, 105a and seats 103, 103a is desired, reference may be had to the U.S. Pat. No. 4,409,714 issued Oct. 18, 1983 to Eldon R. Cunningham which is incorporated herein by reference. While bearings 105, 105a are illustrated herein for purposes of disclosure, it is contemplated that other types of bearings, such as for instance sleeve bearings, ball or roller bearings or bearings integral with the end frames or the like, may be utilized. As previously mentioned, thrust devices 119, 119a are carried on opposite shaft extensions 117, 117a for thrust taking or end play limiting engagement with bearings 105, 105a, respectively, in a manner well known to the art.

A pair of lubrication systems 125, 125a include a pair of feeder wicks 127, 127a associated with bearings 105, 105a and arranged in lubricating engagement with opposite shaft extensions 117, 117a and a pair of lubricant storage wicking means 129, 129a arranged to contain and flow flow lubricant to the feeder wicks, respectively. Storage wicking means or material 129, 129a, may be GELUBE available from the General Electric Company Fort Wayne, Ind., and if a more detailed discussion of the composition and operation of the storage wicking material is desired, reference may be had to U.S. Pat. No. 3,894,956 issued July 15, 1975 to James A. Whitt which is incorporated herein by reference. While feeder wicks 127, 127a and storage wicking material 129, 129a are illustrated herein for purposes of disclosure, it is contemplated that various other feeder and storage wicks having different shapes, formed of different materials and associated in different manners with each other and with the bearings may be utilized. Oil well covers 131, 131a are secured to end frames 93, 93a generally about the central portions thereof to retain storage wicks 129, 129a in place with respect to feeder wicks 127, 127a and bearings 105, 105a, respectively; however, it is contemplated that other means may be employed with the end frames to effect the retention of the storage wick.

To complete the description of dynamoelectric machine 23, a pair of sets of opposite tabs 133, 133a integrally provided on opposite end portions 71, 71a of beams 65 extend through apertures 111, 111a in end frames 93, 93a, and the tabs are deformed so as to capture the end frames between the tabs and the opposite end portions of the beams with the tabs and beams being secured together by a pair of sets of clinched joints indicated generally at 135, 135a, respectively. If a more detailed discussion of clinched joints 135, 35a and the formation of such between beams 65 and end frames 93, 93a is desired, reference may be had to the commonly assigned application Ser. No. 598,902 of James L. King and John E. Hennessy filed Apr. 10, 1984 (now U.S. Pat. No. 4,521,953 issued June 11, 1985) which is incorporated herein by reference. Further, although beams 65 and opposite end frames 93, 93a are shown herein as secured together by clinched joints 135, 135a, it is contemplated that other means may be employed for securing the end frames to the beams against displacement respectively.

With reference to FIGS. 10-14, there is shown an alternative stationary assembly 141 for dynamoelectric machine 23 and an alternative method of assembling such with the alternative stationary assembly 141 having generally the same component parts as the previously discussed stationary assembly 63 and the alternative method having generally the same steps as the method discussed hereinabove with the exceptions noted below. While the alternative method meets at least some of the objects set out hereinbefore, it is believed that such method may have other indigenous objects and advantageous features which will be in part apparent and in part pointed out in the following discussion.

Figure 11:
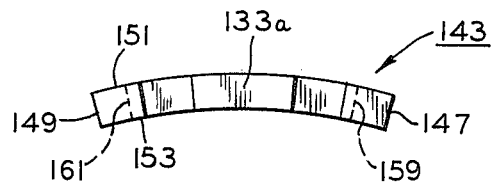
FIG. 11 is an end elevational view of the alternative beam of FIG. 10.
Figure 10:
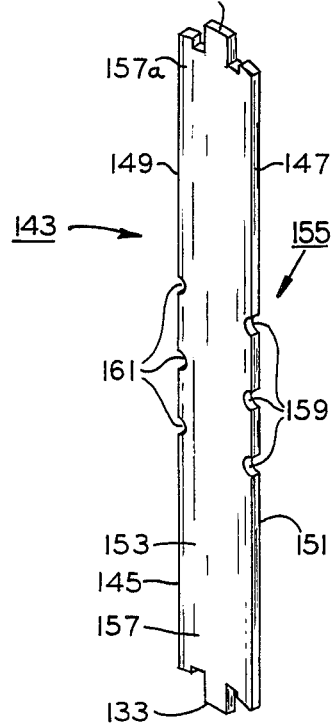
FIG. 10 is a perspective view of an alternative beam which may be utilized with the core of FIG. 3.

As best seen in FIGS. 10 and 11, another beam 143 has a base or cross wall 145 having generally the same arcuate configuration as base walls 47 of grooves 41 in core 21, and a pair of opposite marginal edges or sidewalls 147, 149 are provided on the cross wall intersecting between generally arcuate upper and base surfaces 151, 153 thereof, respectively. Beam 143 has an intermediate portion or section 155 integrally interposed between a pair of opposite end portions or sections 157, 157a thereof. Opposite tabs 133, 133a are integrally formed on opposite end portions 157, 157a of beam 143, and if desired, a set of notches 159, 161 or the like for instance may be formed in opposite marginal edges 147, 149 of the beam, respectively.

Figure 12:
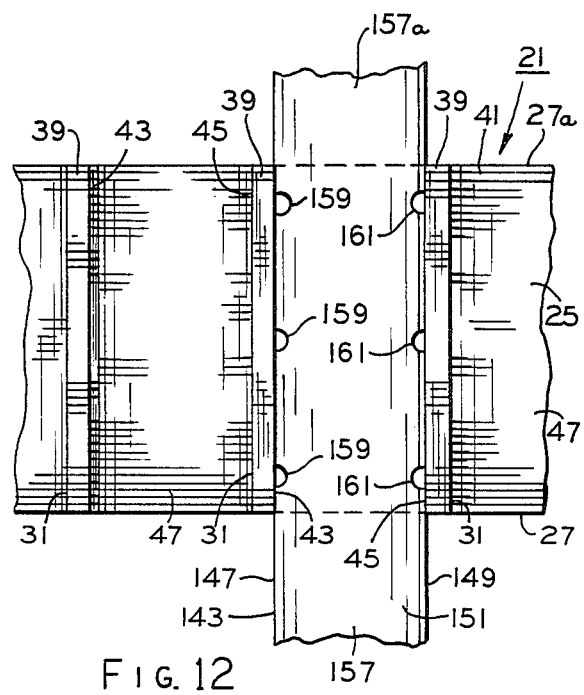
FIG. 12 is a top elevational view of the core of FIG. 3 showing the alternative beam of FIG. 10 associated in a preselected assembly position therewith.
Figure 13:
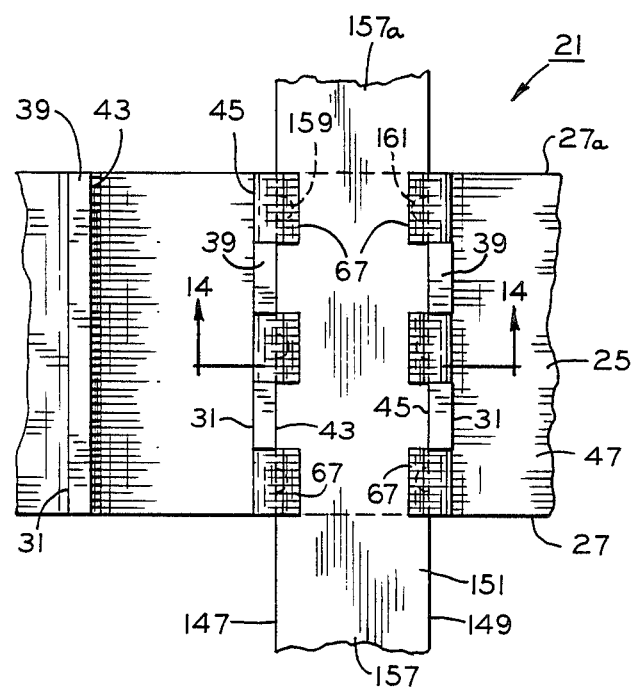
FIG. 13 is generally the same as FIG. 12 but showing sections of adjacent extensions on the core deformed into displacement preventing engagement with the alternative beam in the preselected assembly position thereof.
Figure 14:
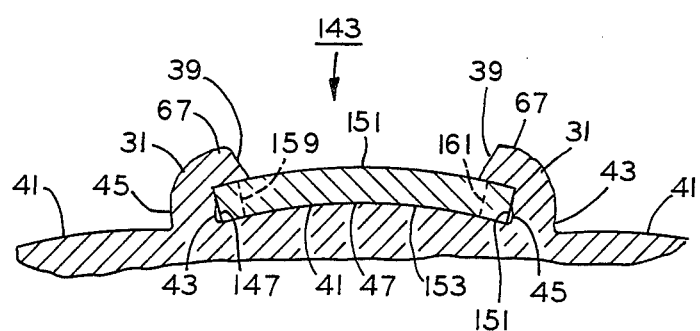
FIG. 14 is a sectional view taken along line 14—14 of FIG. 13.

To place beam 143 in an assembly position therefor with respect to core 21, as best seen in FIG. 12, lower surface 153 on wall 145 of the beam is seated or engaged at least in part against base wall 47 of groove 41 between a pair of adjacent ones of extensions 31 of the core, and opposite marginal edges 147, 149 of the beam are arranged in facing relation with opposed sidewalls 43, 45 of the groove at least adjacent thereto. Of course, when intermediate portion 155 of beam 143 is disposed in groove 41 of core 21, as discussed above, opposite end portions 157, 157a of the beam are projected beyond opposite end faces 27, 27a of the core, respectively. When beam 143 is so disposed in its assembly position with respect to core 21, sections 67 of the adjacent ones of extensions 31 are deformed by suitable tooling (not shown) into gripping or overlaying engagement with confronting parts of beam 143 on upper surface 151 thereof and into abutting engagement with opposite marginal edges 147, 149 of the beams thereby to retain the beam against displacement from its assembly position, respectively, as best seen in FIGS. 13 and 14. When notches 159, 161 are provided in opposite marginal edges 147, 149 of beam 143, a part of at least some of the deformed sections 67 of the adjacent ones of extensions 31 is displaced into the notches in interlocking engagement therewith thereby to at least assist in the retention of the beam against displacement from the assembly positioned thereof. While only one beam 143 and its assembly to core 21 is shown and described herein for purposes of drawing simplification and brevity of discussion, it is, of course, contemplated that a plurality of such beams may be secured either individually or simultaneously to core 21 within the scope of the invention so as to meet at least some of the objects thereof. To complete the discussion of stationary assembly 141, opposite tabs 133, 133a on opposite end portions 157, 157a of beams 143 may be received in apertures 111, 111a of opposite end frames 93, 93a upon the assembly of dynamoelectric machine 23, as previously discussed.

Figure 15:
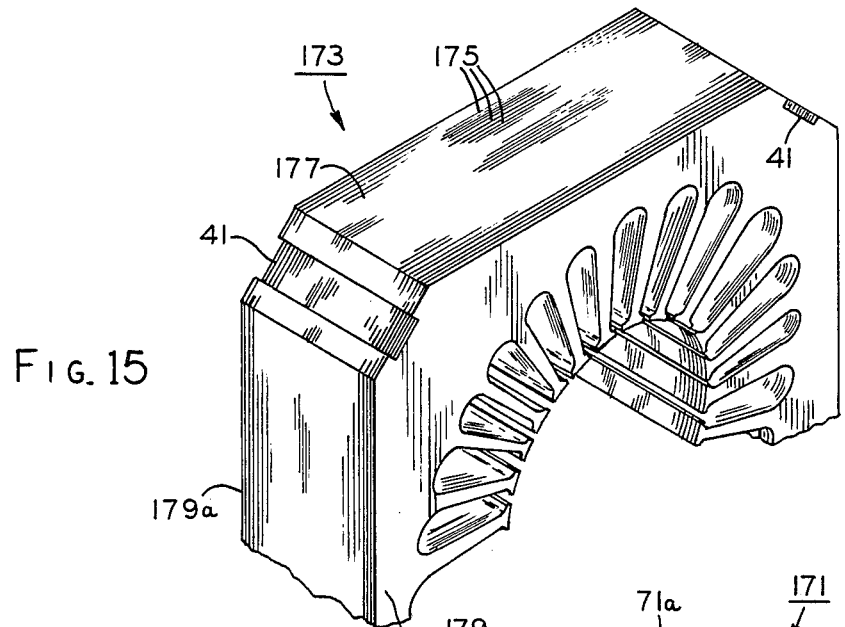
FIG. 15 is a partial perspective view of a core utilized in another alternative stationary assembly for use in the dynamoelectric machine of FIG. 1.
Figure 16:
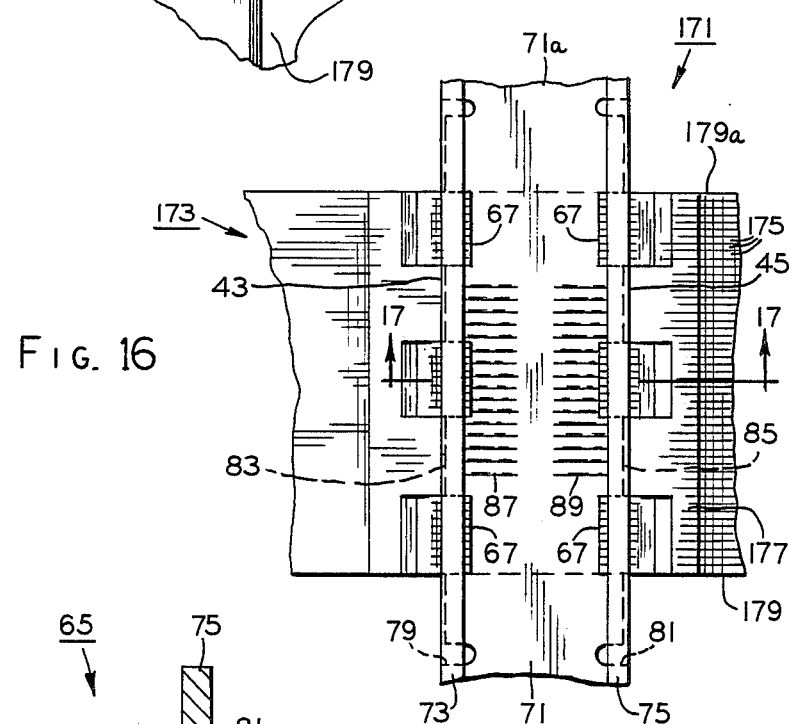
FIG. 16 is an enlarged elevational view taken from FIG. 15 and illustrating the beam of FIG. 3 associated with the core of FIG. 15 with sections deformed from the circumferential portion of the core into displacement preventing engagement with the beam in its preselected assembly position.
Figure 17:
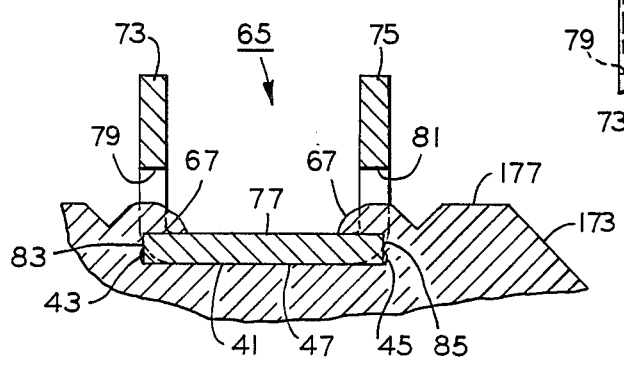
FIG. 17 is a sectional view taken along line 17—17 of FIG. 16.

While edgewise wound core 21 is shown in the embodiments of the invention discussed hereinabove for purposes of disclosure, it is contemplated that various other cores of different constructions and shapes may be utilized in the method of assembling a stationary assembled in one form of the invention so as to meet at least some of the objects thereof. For instance, there is shown in FIGS. 15-17 another alternative stationary assembly 171 having generally the same component parts associated in generally the same manner as those of the previously discussed stationary assembly 63 with the exceptions noted below. While the aforementioned method of assembling assembly 171 meets at least some of the objects set out hereinabove, it is believed that such method may have other indigenous objects and advantageous features as will be in part apparent and in part pointed out in the following discussion.

As best seen in FIG. 15, a core 173 is formed of a stack of individual laminations 175 arranged generally in face-to-face relation and having a circumferential portion or surface 177 interposed between a pair of opposite end faces 179, 179a of the core. Grooves 41 are provided in laminations 175 adjacent the corners of core 173 and are aligned generally in axial row formation so as to extend across the core between opposite end faces 159, 159a thereof, and grooves define a part of circumferential portion 177 of the core, respectively. Beams 65 may be associated in the preselected assembly positions with respect to core 173 and retained against displacement therefrom so as to form stationary assembly 171 in the same manner as previously discussed with respect to stationary assembly 63 and as illustrated in FIGS. 16 and 17.

From the foregoing, it is now apparent that novel methods of assembling stationary assemblies 63, 141, 171 have been presented meeting the objects set forth hereinabove as well as others, and it is comtemplated that changes as to the precise arrangements, shapes, connections and details of the constructions illustrated herein by way of example for purposes of disclosure, as well as the precise steps and order thereof of the methods, may be made by those having ordinary skill in the art without departing from either the spirit of the invention or the scope of the invention as defined by the claims which follow.

What I claim as new and desire to secure by Letters Patent of the United States:

1. A method of assembling a stationary assembly for a dynamoelectric machine, the stationary assembly having a core helically wound from a lanced strip of generally thin ferromagnetic material having a pair of opposite edges, a pair of opposite end faces on the core defining the axial length of the core, a plurality of spaced apart grooves in the lanced strip each having a pair of opposed sidewalls intersecting one of the opposite edges of the lanced strip and a base wall between the opposed sidewalls spaced from the one opposite edge of the lanced strip and with the grooves extending generally in axial row formation between the opposite end faces of the core, and a plurality of lands on the one opposite edge of the lanced strip intersecting with adjacent opposite sidewalls of the grooves in the lanced strip and extending generally in row formation between the opposite end faces of the core, respectively, and a set of beams with each beam including an intermediate portion interposed between a pair of opposite end portions and with the intermediate and opposite end portions being defined at least in part by a pair of opposite sidewalls integrally intersecting with a cross wall, a set of openings extending through the opposite sidewalls at least adjacent the intersections of the opposite sidewalls with the cross wall and at least in part within the intermediate portion, and a set of opposite marginal edges on the cross wall adjacent the openings and at least in part within the intermediate portion, respectively, the method comprising the steps of:

placing the intermediate sections of the beams at least in part within preselected ones of the grooves and extending the opposite end portions of the beams generally axially beyond the opposite end faces of the core, respectively;

disposing a part of the opposite sidewalls of the beams within the intermediate sections thereof at least adjacent the opposed sidewalls of the preselected ones of the grooves and seating the cross walls of the beams within the intermediate sections thereof at least in part in engagement with the base walls of the preselected ones of the grooves during the placing and extending step, respectively;

positioning the openings in the opposite sidewalls of the beam and the opposite marginal edges on the cross wall of the beams at least adjacent the opposed sidewalls of the preselected ones of the grooves during the disposing and seating step; and displacing from the core a set of opposed sections including at least a part of the opposed sidewalls of the preselected ones of the grooves into overlaying engagement with confronting parts on the cross walls of the beams at least adjacent the openings and into abutting engagement with the opposite marginal edges on the cross walls of the beams and retaining thereby the beams against displacement from the preselected ones of the grooves.

2. A method of assembling a stationary assembly for a dynamoelectric machine, the stationary assembly having a core including a pair of opposite end faces with a circumferential surface interposed therebetween, a set of spaced apart grooves in the circumferential surface extending between the opposite end faces of the core with each groove having a pair of opposed sidewalls and a base wall interposed therebetween, respectively, and a set of beams each including a pair of opposite end portions with an intermediate portion interposed therebetween and with the intermediate and opposite end portions being defined at least in part by a cross wall interposed between a pair of opposite sidewalls, respectively, a set of opposite marginal edges on the cross wall, and a set of openings in the opposite sidewalls at least adjacent the cross wall and the opposite marginal edges thereof, respectively, the method comprising the steps of:

placing the beams in preselected assembly positions with respect to the core, respectively;

disposing the intermediate portions of the beams at least in part within at least some of the grooves in the circumferential surface of the core and extending the opposite end portions of the beams beyond the opposite end faces of the core during the placing step, respectively;

engaging the cross walls of the beams at least in part with the base walls of the at least some grooves and arranging the opposite marginal edges of the cross walls and the opposite sidewalls of the beams within the intermediate portions thereof at least adjacent the opposed sidewalls of the at least some grooves during the disposing and extending step; and deforming at least a part of each opposed sidewall of the at least some grooves into abutting engagement with the opposite marginal edges on the cross walls of the beams and in part through the openings in the opposite sidewalls into overlaying engagement with the cross walls of the beams and retaining thereby the beams against displacement from the preselected assembly positions thereof, respectively.

3. A method of assembling a stationary assembly for a dynamoelectric machine, the stationary assembly having a core with a pair of opposite end faces and a circumferential portion interposed therebetween, and at least one beam including a pair of opposite end portions with an intermediate portion interposed therebetween and with the intermediate and opposite end portions being defined at least in part by a cross wall interposed between a pair of opposite sidewalls, and a set of openings in the opposite sidewalls at least adjacent the cross wall and disposed at least in part in the intermediate portion of the at least one beam, respectively, the method comprising the steps of:

placing the at least one beam into a preselected assembly position with respect to the core;

arranging the cross wall and the openings at least in part within the intermediate portion of the at least one beam at least adjacent the circumferential portions of the core and projecting the opposite end portions of the at least one beam beyond the opposite end faces of the core, respectively, during the placing step; and deforming a set of sections of the core at least adjacent the circumferential portion at least in part through the openings into gripping engagement with the cross wall, respectively, and retaining thereby the at least one beam against displacement from the preselected assembly position thereof.

4. The method as set forth in claim 3 wherein the core further includes at least one groove in the circumferential portion interposed between the opposite end faces with the at least one groove having a base wall interposed between a pair of opposed sidewalls and wherein the arranging and projecting step includes engaging the cross wall within the intermediate portion of the at least one beam at least in part with the base wall of the at least one groove and disposing the opposite sidewalls of the at least one beam at least adjacent the opposed sidewalls of the at least one groove, respectively.

5. The method as set forth in claim 4 wherein the deforming and retaining step includes displacing the opposite sidewalls of the at least one groove adjacent the deformed sections of the core into the gripping engagement with the cross wall of the at least one beam, respectively.

6. The method as set forth in claim 4 wherein the cross wall of the at least one beam includes a set of serrations disposed at least adjacent the openings and wherein the deforming and retaining step includes interlocking the deformed sections at least in part with the serrations, respectively.

7. A method of assembling a stationary assembly for a dynamoelectric machine, the statonary assembly including a core having a circumferential portion with at least one groove therein with the circumferential portion and the at least one groove being interposed between a pair of opposite faces of the core, respectfully, and at least one beam having an intermediate portion interposed between a pair of opposite end portions thereof, respectively, the method comprising the steps of:

placing the at least one beam in a preselected position with respect to the core;

disposing the intermediate portion of the at least one beam at least in part within the at least one groove in the circumferential porion of the core the opposite end portions of the at least one beam beyond the opposite end faces of the core during the placing step, respectively; and deforming only the core while the at least one beam is disposed at least generally in the placed preselected position thereof to displace at least a set of sections of the core at least adjacent the circumferential portion of the core and the at least one groove therein into gripping engagement with confronting parts on the intermediate portion of the at least one beam, respectfully, and retaining thereby the at least one beam against displacement from the placed preselected position thereof.

8. A method of assembling a stationary assembly for a dynamoelectric machine, the stationary assembly including a core having a pair of opposite end faces with a circumferential portion therebetween, and at least one beam, the method comprising the steps of:

disposing the at least one beam in a preselected position with the core at least generally adjacent the circumferential portion thereof and deforming only the core while the at least one beam is in the disposed preselected position thereof so as to displace a plurality of parts of the core at least generally adjacent the circumferential portion thereof into gripping engagement with the at least one beam in its disposed preselected position, respectively, and retaining thereby the at least one beam against displacement from the disposed preselected position thereof.

9. The method as set forth in claim 8 wherein the stationary assembly further includes at least one groove in the circumferential portion of the core and extending between the opposite end faces thereof, respectively, and wherein the disposing step includes placing a part of the at least one beam at least in part within the at least one groove when the at least one beam is in the disposing preselected position thereof.

10. The method as set forth in claim 9 wherein at least the at least one beam part includes a pair of opposite marginal edges and wherein the deforming and retaining step includes displacing the core into overlaying engagement with the at least one beam part and into abutting engagement with the opposite marginal edges of the at least one beam part, respectively.

11. The method as set forth in claim 10 wherein the at least one beam part further includes a set of notches in the opposite marginal edges and wherein the displacing step includes interlocking the core parts at least in part with the notches, respectively.

12. The method as set forth in claim 9 wherein the at least one beam includes a pair of opposite sidewalls and a base wall interposed therebetween with a set of openings extending through the opposite sidewalls at least adjacent said base wall generally at the at least one beam part and wherein the deforming and retaining step includes displacing the core parts at least in part into the openings into the gripping engagement with the base wall of the at least one beam, respectively.

13. The method as set forth in claim 8 wherein the core parts comprise at least a pair of adjacent extensions extending generally outwardly with respect to the circumferential portion of the core, the at least one beam in its disposed preselected position extending in part between the adjacent extensions, and wherein the deforming and retaining step includes displacing the adjacent extensions at least in part into the gripping engagement with the at least one beam.

14. The method as set forth in claim 8 wherein the core further includes at least a pair of adjacent extensions extending generally outwardly with respect to the circumferential portion of the core, the at least one beam in its disposed preselected position extending in part between the adjacent extensions, and wherein the deforming and retaining step includes displacing at least one section of each of the adjacent extensions into the gripping engagement with the at least one beam.

15. A method of assembling a stationary assembly for a dynamoelectric machine, the stationary assembly including a core having a circumferential portion with at least one groove therein and with the circumferential portion and the at least one groove interposed between a pair of opposite end faces of the core, the groove having a base wall interposed between a pair of opposed sidewalls, and at least one beam having an intermediate portion interposed between a pair of opposite end portions with the intermediate portion and opposite end portions defined at least in part by another base wall interposed between a pair of opposite sidewalls, respectively, the method comprising the steps of:

placing the at least one beam in a preselected assembly position thereof with respect to the core;

arranging the intermediate portion of the at least one beam within the at least one groove with the another base wall of the at least one beam being seated at least in part against the first named base wall of the at least one groove and with the opposite sidewalls of the at least one beam being disposed at least adjacent the opposed sidewalls of the at least one groove and projecting the opposite end portions of the at least one beam beyond the opposite end faces of the core during the placing step, respectively; and deforming at least a part of each opposed sidewall of the at least one groove from the circumferential portion of the core into abutting engagement with the opposite sidewalls of the at least one beam and into overlaying engagement with the at least one beam to maintain the another base wall seated at least in part with the first named base wall of the at least one groove and retaining thereby the at least one beam against displacement from the preselected assembly position thereof with respect to the core.

16. The method as set forth in claim 15 wherein the deforming and retaining step includes displacing a set of sections of the opposed sidewalls from the circumferential portion of the core into the abutting engagement with the opposite sidewalls of the at least one beam and into the overlaying engagement therewith, the displaced sections comprising the deformed at least part of the opposed sidewalls, respectively.

17. The method as set forth in claim 15 wherein the at least one beam includes a set of notches in the opposite sidewalls thereof and wherein the deforming and retaining step includes interlocking the notches with the deformed at least part of the opposed sidewalls of the at least one groove, respectively.

18. A method of assembling a stationary assembly for a dynamoelectric machine, the stationary assembly including a strip of generally thin ferromagnetic material having a pair of opposite edges with the strip being edgewise and helically wound into a core having a pair of opposite end faces, a plurality of oppositely disposed extensions and teeth on the strip terminating at the opposite edges thereof and extending generally in axial row formation between the opposite end faces of the core with the teeth defining in part a bore of the core and with the extensions being arranged in radial alignment with respective ones of the teeth, respectively, and at least one beam having a base wall interposed between a pair of opposite sidewalls and a set of openings in the opposite sidewalls at least adjacent the base wall, respectively, the method comprising the steps of:

placing the at least one beam in a preselected assembly position with respect to the core between a pair of adjacent extensions thereof;

disposing the opposite sidewalls of a part of the at least one beam at least adjacent the adjacent extensions with at least a part of the openings in the opposite sidewalls of the at least one beam facing the adjacent extensions, respectively, and engaging the base wall of the at least one beam at least in part with the core between the adjacent extensions during the placing step; and deforming at least a part of the adjacent extensions at least in part through the openings in the opposite sidewalls of the at least one beam into gripping engagement with the base wall thereof, respectively, and retaining thereby the at least one beam against displacement from the preselected assembly position of the at least one beam with respect ot the core.

19. The method as set forth in claim 18 wherein the at least one beam also has a set of opposite serrations on the base wall at least adjacent the openings in the opposite sidewalls and wherein the deforming and retaining step includes interlocking the deformed parts of the adjacent extensions with at least a part of the serrations, respectively.

20. The method as set forth in claim 18 wherein the at least one beam also has a set of opposite marginal edges on the base wall at least adjacent the openings in the opposite sidewalls and wherein the deforming and retaining step includes abutting a part of the deformed parts of the adjacent extensions with at least a part of the opposite marginal edges on the base wall of the at least one beam, respectively.

21. The method as set forth in claim 18 wherein the disposing and engaging step includes extending at least another part of the beam beyond at least one of the opposite end faces of the core.

22. A method of assembling a stationary assembly for a dynamoelectric machine, the stationary assembly having at least one beam, and a lanced strip of generally thin ferromagnetic material, the lanced strip including a plurality of teeth spaced apart on a plurality of preselected pitch axes therefor, and a plurality of extensions spaced apart on the preselected pitch axes of at least some of the teeth and extending generally opposite to the at least some teeth, respectively, the method comprising the steps of:

deforming the lanced strip into a generally annular core of continuous helical convolutions of the deformed lanced strip with the annular core having a centerline axis and extending the teeth on their preselected pitch axes generally radially inwardly toward the centerline axis with the extensions on the preselected pitch axes of the at least some teeth extending generally radially outwardly from the centerline axis;

positioning the teeth and the extensions generally in axial row formations across the annular core during the deforming and extending step so that a radial dimension of the annular core between the centerline axis and a respective one of the extensions across a tooth of the annular core in the axial row formation thereof is greater than any other radial dimension of the annular core;

placing the at least one beam in a preselected position on the annular core and in part between a pair of adjacent ones of the extensions; and deforming only the adjacent ones of the extensions with the at least one beam in its placed preselected position and displacing thereby at least a part of each of the adjacent ones of the extensions into displacement preventing engagement with the at least one beam in its placed preselected position on the annular core.

23. The method as set forth in claim 22 wherein the at least one beam has a base wall and a pair of generally opposite sidewalls, and wherein the placing step includes seating the base wall at least in part on the annular core between the adjacent ones of the extensions and disposing the opposite sidewalls at least adjacent the adjacent ones of the extensions, respectively.

24. The method as set forth in claim 23 wherein the deforming and displacing step includes overlaying the at least part of the adjacent ones of the extensions with the base wall of the at least one beam in the placed preselected position thereof.

25. The method as set forth in claim 24 wherein the deforming and displacing step further includes abutting the at least part of the adjacent ones of the extensions with at least a part of the opposite sidewalls, respectively.

26. The method as set forth in claim 22 wherein the at least one beam also has a set of openings in the sidewalls at least generally adjacent the basewall, respectively, and wherein the deforming and displacing step includes extending the at least part of the adjacent ones of the extensions at least in part through the openings into the displacement preventing engagement with the at least one beam in its placed preselected position.

27. The method as set forth in claim 22 wherein the deforming and displacing step includes applying a generally radially directed a force onto each of the adjacent ones of the extensions and effecting thereby the displacement of the at least part of the adjacent ones of the extensions.

28. The method as set forth in 27 wherein the deforming and displacing step includes supporting at least the at least some teeth on the preselected pitch axes as the adjacent ones of the extensions are displaced and opposing thereby the applied forces.

29. A method of assembling a stationary assembly for a dynamoelectric machine, the stationary assembly having at least one beam and a lanced strip of generally thin ferromagnetic material, the lanced strip including a plurality of teeth spaced apart on a plurality of preselected pitch axes therefor, and a plurality of extensions spaced apart on the preselected pitch axes of at least some of the teeth and extending generally opposite to the at least some teeth, respectively, and the at least one beam including a base wall interposed between a pair of generally opposite sidewalls, the method comprising the steps of:

deforming the lanced strip into a generally annular core of continuous helical convolutions of the deformed lanced strip and extending the teeth on their preselected pitch axis generally radially inwardly of the annular core with the extensions on the preselected pitch axes of the at least some teeth extending generally radially outwardly of the annular core;

placing the at least one beam in a preselected position on the core between a pair of adjacent ones of the extensions;

seating the base wall of the at least one beam at least in part against a section of the annular core between the adjacent ones of the extensions and disposing the opposite sidewalls at least in part at least generally adjacent the adjacent ones of the extensions, respectively, during the placing step; and displacing at least a part of only the adjacent ones of the extensions into abutment with the opposite sidewalls and into overlaying engagement with the at least one beam to maintain the base wall seated at least in part with the section of the annular core between the adjacent ones of the extensions and retaining thereby the at least one beam against displacement from its preselected position with respect to the annular core.

* * * * *